United States Patent [19]
Montgomery

[11] 3,782,711
[45] Jan. 1, 1974

[54] SAWMILL DOG ASSEMBLY

[76] Inventor: Hubert T. Montgomery, Chestnut St., Delta, Pa. 17314

[22] Filed: June 15, 1972

[21] Appl. No.: 263,282

[52] U.S. Cl............ 269/31, 269/54.2, 269/58
[51] Int. Cl............................................ B27b 29/02
[58] Field of Search .................. 269/24, 25, 30, 31, 269/54.1, 54.2, 54.3, 58, 71; 83/726

[56] References Cited
UNITED STATES PATENTS

| | | | |
|---|---|---|---|
| 3,089,523 | 5/1963 | Shashaty | 269/31 |
| 3,566,933 | 3/1971 | Pryor | 269/54.2 |
| 3,071,170 | 1/1963 | Pease et al. | 269/31 |
| 3,079,962 | 3/1963 | Hartzell | 83/726 X |
| 3,088,501 | 5/1963 | Good et al. | 83/726 |

Primary Examiner—Othell M. Simpson
Attorney—C. Hercus Just

[57] ABSTRACT

A sawmill dog assembly having a headblock supported for longitudinal slidable movement upon a base plate carried by a supporting channel member to be fixed to a sawmill carriage. Upper and lower dog members are arranged for limited floating movement in vertical and horizontal directions relative to the front face of the headblock. A plurality of fluid operated cylinder units respectively operate the outer ends of the dog members vertically to engage a log or plank to be sawed, move the headblock and dog members as a unit relative to the base plate, and move the outer ends of the dog members horizontally relative to the front face of the headblock.

7 Claims, 15 Drawing Figures

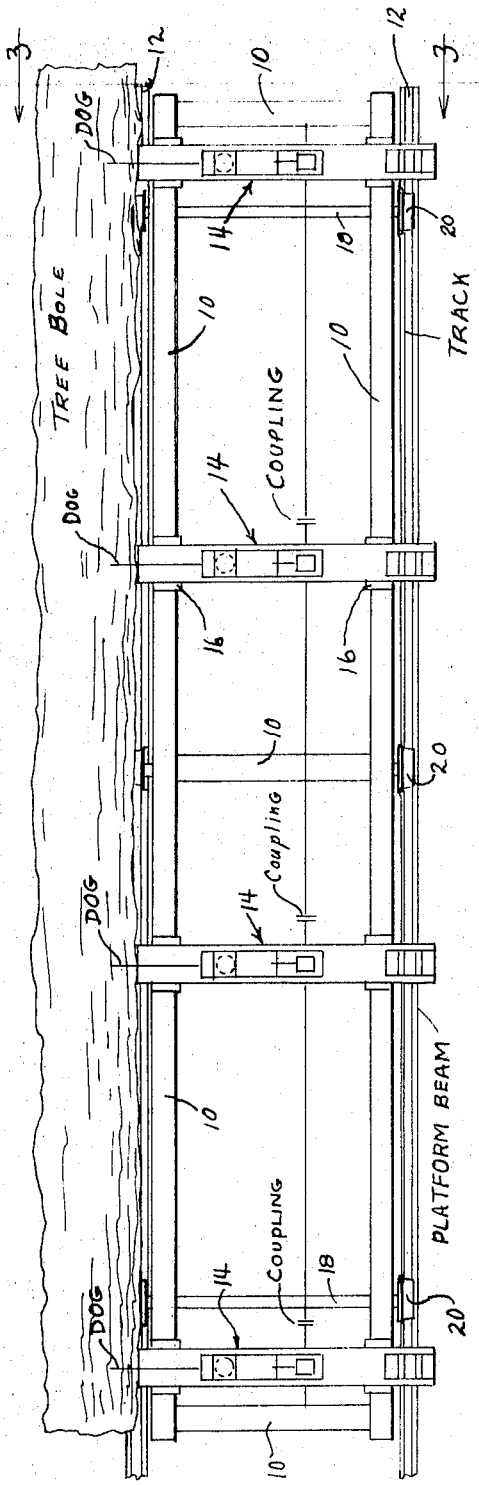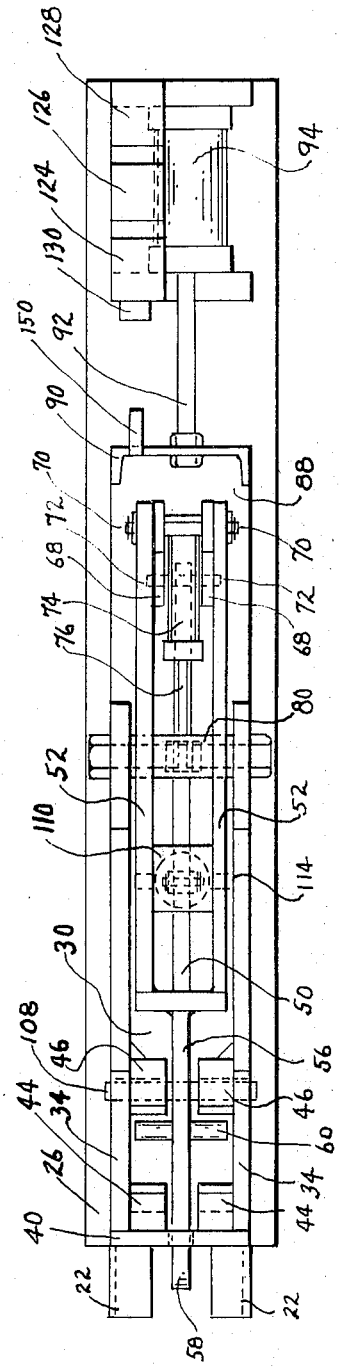

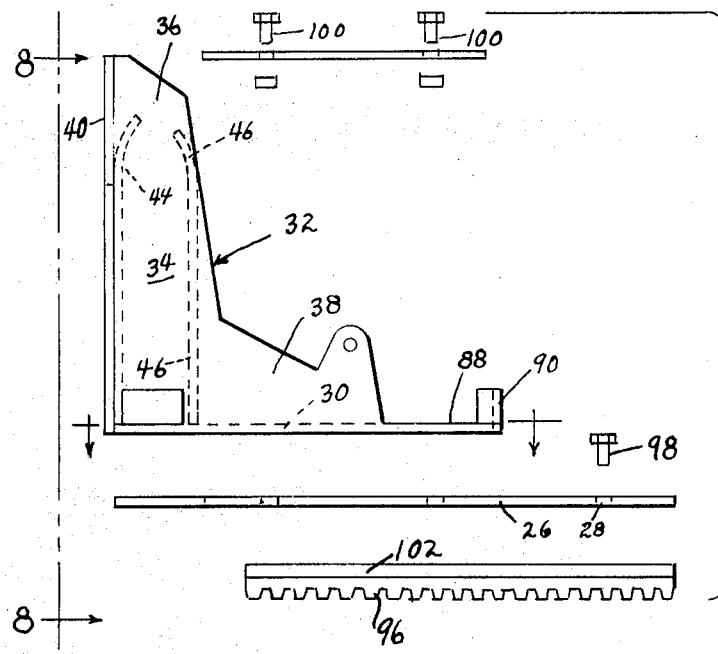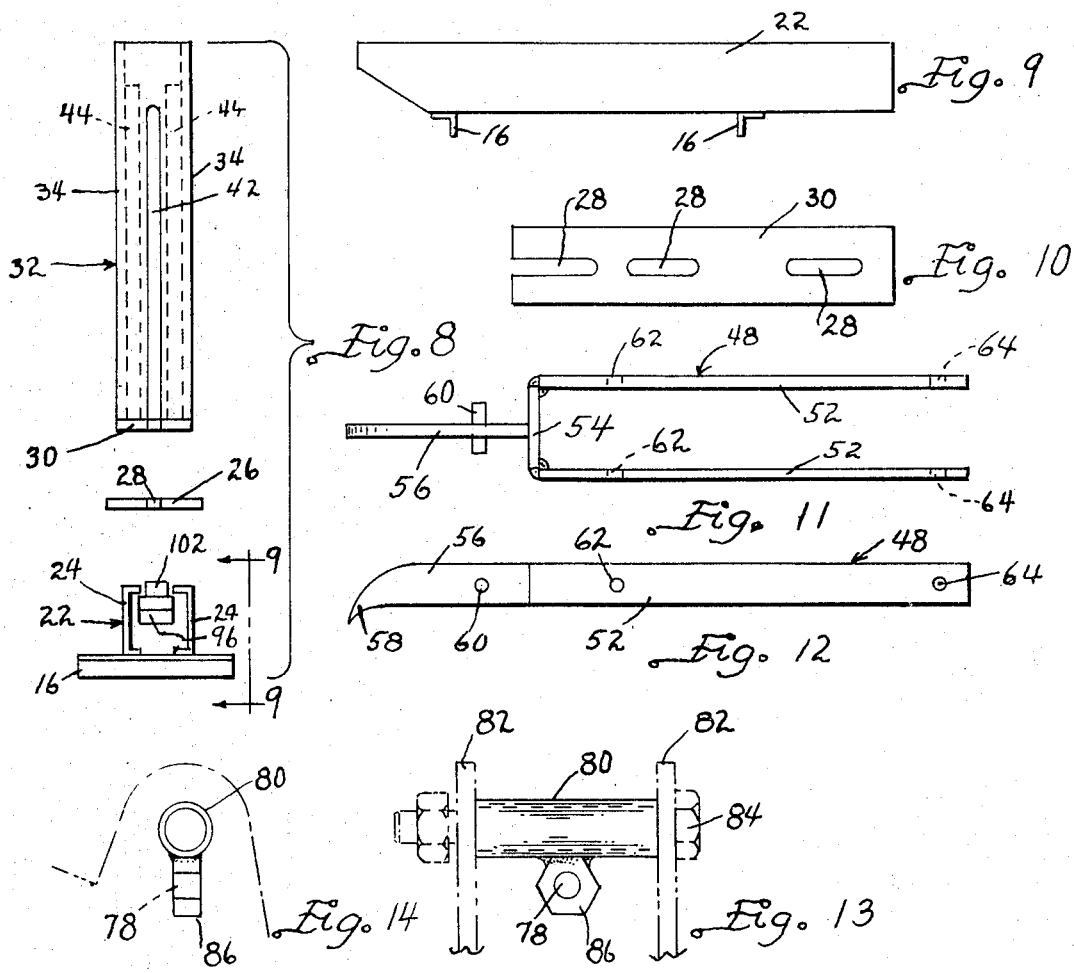

SAWMILL DOG ASSEMBLY

BACKGROUND OF THE INVENTION

Sawmill dog assemblies are used in relation to a carrier movable along a track way in a sawmill, by power means, to support a log and move the same relative to a saw blade. After each cut is made in the log by the blade, the outer face of the log is advanced a predetermined distance by suitable mechanism operable relative to the carriage and the power means which moves the carriage then propels it relative to the saw to make another cut. This procedure is repeated until the entire log has been sawed into planks or other similar elements in accordance with normal sawmill operations.

It is customary to provide a plurality, such as three or four, dog assemblies upon such carriage in longitudinally spaced relationship thereon so as to be capable of supporting a log of reasonable length upon the carriage. Especially for protection of the operators, it is customary at present to operate the dog assemblies and the carriage by remotely positioned control means by which certain power means associated with the dog assemblies are operated.

Dog assemblies of the type referred to normally include a headblock which extends vertically and is associated with a horizontally extending supporting member which is directly connected to the sawmill carriage. The headblock supports the outer end portions of a pair of dog assemblies which normally terminate in sharpened ends, known as bits in the sawmill industry, the ends of the dog assemblies which support said bits extending outwardly a predetermined distance beyond the front face of the headblock. The dog members respectively comprise upper and lower members. Power means, such as fluid operated cylinder units, normally are employed to move the dog members toward and from each other. Additional power means such as fluid-operated cylinder units move the bits of the dog members in horizontal directions relative to the front face of the headblock, and suitable rack and pinion means are employed to advance the headblock and the dog members carried thereby outwardly with respect to the outer end of the supporting member incident to moving the outer face of a log stepwise outwardly for successive cuts to be made from the log by the saw blade. Reverse movement of the rack and pinion means retract the headblocks and dog members on the carriage simultaneously to the initial or starting position thereof after the sawing of a log has been completed.

Sawing logs is arduous work. In Colonial times, except for a limited number of power-operated sawmills, the sawing of logs was accomplished manually. Development of power-operated sawmills and the improvement of the details thereof has been a steady objective of the lumber industry for many years. In more recent years, the development has largely been in the direction of providing power-operated equipment and means to control the same at safe distances from the operation of the saw blade. At present, relatively sophisticated and complex sawmill dog assemblies are in use, examples of which are as follows.

U.S. Pat. No. 3,088,501 in the name of Good et al issued May 7, 1973, shows certain types of power operated sawmill dog assemblies illustrated in use upon a carriage of the type referred to, control means for the operation of the assemblies also being illustrated. Certain cam slots and cam followers are utilized in said mechanism which are subject to wear and one of the objects of the present invention is to provide a dog assembly which is designed to minimize wear upon the individual elements thereof.

U.S. Pat. No. 3,566,933, to Pryor, issued Mar. 2, 1971, shows a relatively complex sawmill dog assembly utilizing an extensive number of links and levers for purposes of positioning the dog members relative to the supporting housing in which such linkage is enclosed. In contrast, the present invention provides a dog assembly which employs a minimum amount of linkage and substitutes therefor certain cam means to control the positions of the outer ends of the dog members of the assembly incident to engaging and otherwise moving a log when supported by the assembles upon a sawmill carriage.

SUMMARY OF THE INVENTION

It is the principal object of the present invention to provide a sawmill dog assembly of a type adapted to be installed upon a sawmill carriage upon which a plurality of such assemblies may be mounted, said dog assembly comprising a headblock of simple construction fabricated from sheet steel members and including a vertical forward portion having a front face, against which a log is clamped to be sawed, and a horizontal rearward portion having a rearward extension to which a fluid-operated cylinder unit is connected for purposes of effecting limited advancing and retracting movements of the headblock relative to a base plate to permit individual adjustment of such headblocks in the plurality of dog assemblies on a carriage, especially for purposes of actually bending a crooked log into relatively straight condition, for example, the means by which the headblock is moved relatiive to the base plate being simple but highly effective.

Another object of the invention is to provide vertically extending narrow guide strips extending toward each other from opposite interior surfaces of the headblock and spaced apart in a horizontal direction for purposes of receiving therebetween laterally extending lugs on the dog members so as to confine the horizontal movements of the dog members to the distance existing between the guide strips and thereby minimize the amount of linkage or other control mechanism for the movement of said dog members particularly in a horizontal direction.

It is a further object of the invention to provide simple but effective means for supporting an additional fluid-operated cylinder and piston unit in which the outer end of the piston rod is connected to the rearward portion of the headblock and the cylinder is connected intermediately between the opposite ends of equalizing links which extend between and respectively are connected to the ends of the dog members opposite those upon which the sharpened bits are carried.

Still another object of the invention is to provide combination guide and shield means on the horizontal base plate, said guide and shield means comprising a strip which overlies a horizontal bottom plate of the headblock in which a series of longitudinally extending slots are formed in longitudinally spaced relationship to each other for the reception of guide bolts, collars of slightly greater length than the thickness of the bottom plate of the headblock being disposed in said slots and receiving the guide bolts therethrough for clamping of the shielding strip relative to the upper surface of the bottom plate of the headblock, the length of the spacing collars permitting such slidable movement of the headblock relative to the base plate without offering abnormal friction but also enabling the shield strip to serve as positioning and retaining means for the headblock relative to the base plate in a manner to prevent canting of the headblock relative to the base plate and the other supporting means upon which the base plate is mounted.

Details of the foregoing objects and of the invention, as well as other objects thereof, are set forth in the following specification and illustrated in the accompanying drawings comprising a part thereof.

BRIEF DESCRIPTION OF THE DRAWINGS

FIG. 1 is a horizontal, somewhat diagramatic plan view of an exemplary sawmill carriage upon which a plurality of dog assemblies embodying the present invention are mounted, said view also illustrating an exemplary log supported relative to the carriage by said dog assemblies.

FIG. 2 is a top plan view of an individual dog assembly embodying the principles of the present invention and illustrated on a larger scale than employed in FIG. 1.

FIG. 7 is an exploded side elevation of the headblock and a portion of the supporting and actuating means therefor.

FIG. 8 is an exploded vertical front elevation of the elements illustrated in FIG. 7 as seen on the line 8 — 8 thereof, FIG. 8 also illustrating an additional supporting channel means for the headblock.

FIG. 9 is a side elevation of the channel means shown in FIG. 8 as seen on the line 9 — 9 thereof.

FIG. 10 is a plan view of the base plate shown in certain of the preceding figures.

FIG. 11 is a top plan view of the upper dog member of the assembly shown in FIGS. 2 — 6.

FIG. 12 is a side elevation of the upper dog member shown in FIG. 11.

FIG. 13 is a vertical fragmentary view of a detail of the horizontal rearward portion of the headblock to which power means for actuating the same is connectable.

FIG. 14 is a fragmentary side elevation of the details shown in FIG. 13.

DETAILED DESCRIPTION

Figure 3:
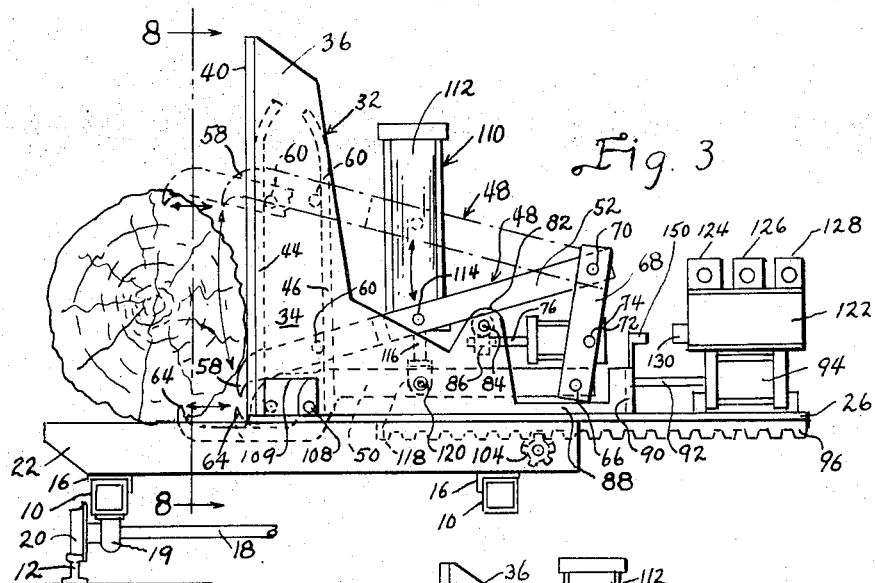
FIG. 3 is a vertical side view of a carriage and one of the sawmill dogs illustrated in FIG. 1 as seen on the line 3 — 3 thereof.

Referring to FIG. 1, which is a plan view of an exemplary sawmill carriage 10 that is movable horizontally along a pair of parallel supporting and guide tracks 12, it will be seen that said carriage supports a plurality of sawmill dog assemblies 14 which embody the principles of the present invention. The carriage 10 comprises a pair of parallel, exemplary longitudinal frame members 16 which may be any one of a number of appropriate types which do not specifically comprise part of the present invention, the same principally being included to show a complete structure to which the present invention pertains. In FIG. 3, further details associated with the carriage are illustrated, the same comprising axle 18 which has flanged wheels 20 on opposite ends thereof that engage the track members 12.

Figure 4:
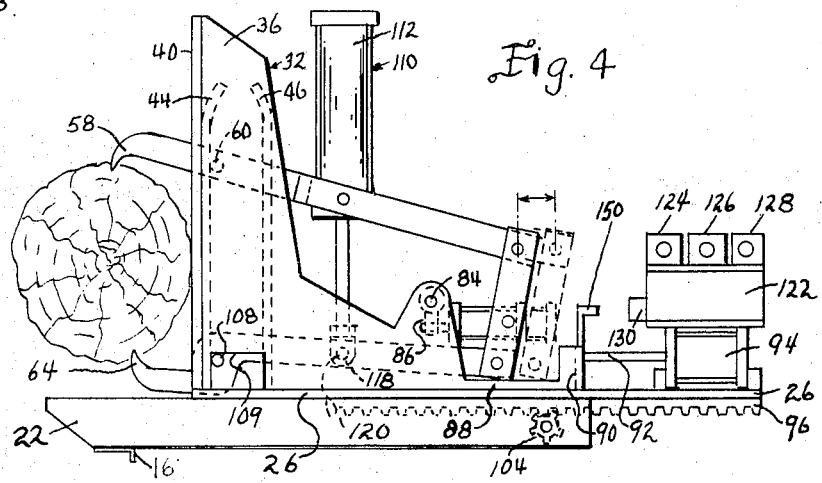
FIG. 4 is a view similar to FIG. 3 but illustrating the dog members in a different relationship with respect to the headblock and the headblock also being differently positioned with respect to its supporting channel from that shown in FIG. 3.

The sawmill dog assembly which embodies the improvements comprising the present invention includes a supporting channel member 22 which extends transversely to and is connected to the frame member 16 of the carriage, for example. Channel member 22 preferably is of a composite nature, as can be seen in end view in FIG. 8. One form thereof may comprise a pair of parallel channels 24, the upper flanges of which are spaced apart to provide a slot. Referring particularly to FIGS. 3 and 4, it will be seen that the channel member 22 supports a flat, elongated base plate 26 which is shown in plan view in FIG. 10. Base plate 26 is slidable relative to the upper surface of channel member 22. Slidably supported upon the upper surface of base plate 26 is bottom member 30 of headblock 32. It will be seen that said bottom member 30 has a series of elongated slots 28 therein, the one nearest the left-hand end of the plate being open in the end. For convenience of manufacture, the headblock 32 comprises a pair of parallel side plates 34 which, in side elevation, as shown in FIGS. 3, 4 and 7, are somewhat L-shaped. These comprise a vertical forward portion 36 and a horizontal rearward portion 38. The lower edges of the side plates 34 are connected, such as by welding, to the opposite side edges of the bottom member 30. Also, a vertical plate 40 extends between and is connected, such as by welding or otherwise, to the forward edges of the side plates 34, the outer surface of plate 40 comprising the front face of the headblock 32. Plate 40 also is provided with a vertical slot 42 which extends from the lower end of the plate upwardly but terminates a predetermined distance below the upper end of said plate as is best shown in FIG. 8.

The inner face of the side plates 34 of the headblock respectively support narrow, vertically extending guide strips 44 and 46 which are shown in plan view in FIG. 2 and the side elevation and shape of the same are best illustrated in FIGS. 3, 4 and 7. The upper ends of the guide strips 44 and 46 are slightly curved inwardly toward each other as also shown in said figures, for purposes to be described.

One of the principal functions of the headblock 32 is to support a pair of dog members 48 and 50. The dog member 48 is referred to as the upper member, while the dog member 50 is referred to as the lower member. In side elevation, they are somewhat similar in shape but in plan view they are different. Referring to FIGS. 11 and 12 in particular, it will be seen that the upper dog member 48 is of a composite nature and comprises a pair of transversely spaced, parallel legs 52 which are connected at the outer ends by cross member 54. A forward end portion 56 terminates in a sharpened bit 58. Extending transversely through the forward end portion 56 is a relatively short lug or pin 60 which comprises a control member, the function of which is described in detail hereinafter. The legs 52 also are provided respectively with transversely aligned pivot holes 62 and 64, see FIGS. 11 and 12.

The lower dog member 50 has a uniform thickness, being formed from sheet steel of appropriate gauge. The forward end thereof terminates in a somewhat irregular configuration, having a sharpened bit 64 thereon. The rearward end thereof has a pivot hole therein to receive a transverse connecting pin 66 which extends through the lower ends of a pair of similar equalizing links 68. The upper ends thereof are respectively pivotally connected by connecting pins 70 to the rearward ends of the legs 52 of the upper dog member 48.

Intermediately of the ends thereof, the equalizing links 68 are connected by pivot pins 72 to the housing of cylinder unit 74, the same being referred to as a first fluid operated cylinder unit. The outer end of the piston rod 76 thereof extends through a bore 76 of a connecting member which also includes a sleeve 80 which extends between a pair of upwardly extending projections 82 comprising part of and being located at the rearward end of the horizontally extending rearward portion 38 of the side plates 34. Suitable means such as a bolt 84 extends through suitable holes in the projections 82 and also through the sleeve 80. AS an expedient, the bore 78 may be formed in a threaded nut 86 which is engaged by appropriate threads formed on the outer end of the piston rod 76. If desired, suitable lock nuts may be threaded on the said end of the piston rod also and respectively abut opposite faces of the nut 86 to secure the piston rod effectively to the nut 86. For reasons to be explained hereinafter, it is necessary for the cylinder unit 74 to have a limited amount of pivotal movement about the axis of the bolt 84, and the arrangement shown especially in details in FIGS. 13 and 14 permits such movement readily.

For purposes of slidably moving the headblock 32 relative to base plate 26, such as for purposes of independently moving one of said headblocks and the dog members carried thereby relative to other headblocks in the assembly of the other headblocks carried by the carriage 10, such as to effect a straightening of a bent or crooked log, for example, bottom member 30 of the headblock extends rearwardly to comprise a rearward extension 88, the same terminating in a short vertical member 90 to which the outer end of a piston rod 92 of a second fluid-operated cylinder unit 94 is connected. The cylinder per se of the fluid unit 94 is fixedly connected to the base plate 26. Accordingly, when fluid pressure is exerted, as desired, against one or the other ends of the piston within cylinder 94, the headblock 32 will be moved relative to the base plate 26 for the purposes described above for example.

Fixedly connected to the lower surface of the base plate 26 is an elongated toothed rack 96 which is slightly shorter than the base plate 26, as can be best seen in FIGS. 3, 4 and 7. For example, an appropriate connecting bolt 98 fixes the base plate 26 to the upper surface of the rack 96. Also, a pair of guide bolts 100, an additional function of which is described hereinafter, also extends through the suitable holes in the bottom member 30 of headblock 32, said guide bolts also extending through suitable holes in base plate 26 and the lower ends thereof also being threaded into appropriate tapped holes in rack 96. Said guide bolts 100 also extend through the slots 28 of bottom member 30 and thus permit slidable movement of the headblock 32 relative to base plate 26. Guide bolts 100 also extend through holes in dust strip 101 which covers slots 28 which receive bushings 101' to slightly space strip 101 out of contact with bottom members 30 and guide movement of the headblocks on base plate 26.

The rack 96 also has a narrower, upper rib 102 which extends between the upper flanges of the channels 24 comprising the channel member 22. Base plate 26 abuts and is connected to the upper surface of the guide rib 102 and forms channels for guided support the headblocks by the upper flanges of channels 24 relative to channel member 22.

Figure 5:
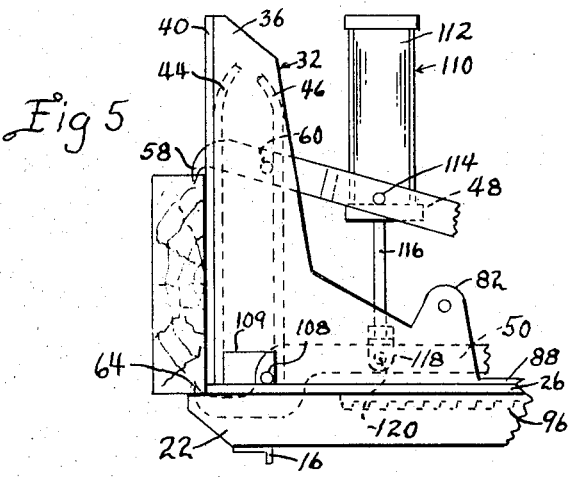
FIG. 5 is a fragmentary side elevation showing part of the dog assembly illustrated in FIGS. 3 and 4 and showing a still further variation in the position of the headblock relative to its supporting channel for pruposes of supporting a sawed plank relative to the front face of the headblock.
Figure 6:
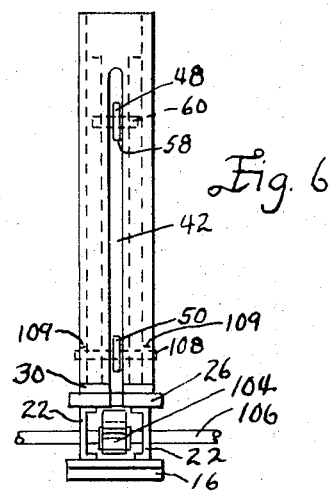
FIG. 6 is a fragmentary vertical elevation showing the front face of the headblock and the dog members supported thereby as seen on the line 6 — 6 on FIG. 3.

Movement of the aforementioned assembly including rack 96, base plate 26, and the headblock 32 and apparatus carried thereby relative to the supporting channel member 22 is effected by a spur gear 104 supported on a shaft 106, see FIG. 6, which extends between the vertical flanges of the channels 22. Shaft 106 extends longitudinally of the carriage 10 between all of the headblocks 32 and normally moves the same simultaneously, transversely to the axis of the carriage 10, such as when advancing the front face of a log relative to a saw blade for additional cuts to be made thereby. Under such circumstances, the second cylinder unit 92 also normally is moved with such assembly when the racks 96 are moved but, for reasons described above, the headblocks 32 also may be moved longitudinally upon the base plate 26, when desired, such as for purposes of straightening a bent log and the like. The lower dog member 50 also has a transverse pin 108 extending therethrough at a predetermined distance from the outer end thereof and functions similarly to pin 60 in the upper dog member 48. The opposite ends of the pin 108 respectively are engageable with the walls of opening guide stirps 44 and 46 and controls the horizontal and vertical movement of the lower dog member 50 relative to the headblock 32. By way of specific example, but without limitation thereto, it is indicated that the pins 60 and 108 are located relative to the sharpened bits on the outer ends of the upper and lower dog members 48 and 50 at positions so that, for example, when the pins are disposed in abutting relationship with the guide strip 46, the bits 58 and 64 will be spaced outwardly from the front face of the headblock 32 approximately five-eighths inch. However, when the pins 60 and 108 are disposed in abutting relationship against the other guide strips 44, the sharpened bits 58 and 64 will be positioned a distance of approximately 3½ inch from the front face of the headblock 32. These distances are respectively afforded regardless of the vertical positions of the upper and lower dog members 48 and 50 with respect to each other and the supporting channel member 22. This is due to the curved arrangement of the upper ends of the guide strips referred to above and clearly shown in FIGS. 3, 5 and 7.

For purposes of effecting such vertical movement of the dog members 48 and 50 with respect to each other as well as with respect to the headblock 32, the structure of the present invention includes a third fluid-operated cylinder unit 110. Said unit comprises a cylinder 112 which extends substantially vertically in most positions of operation with respect to the upper dog member 48. Opposite sides of the lower end of the cylinder 112 have axially aligned trunnions 114 projecting therefrom and extending into appropriate complementary bearings in the parallel legs 52 of the upper dog member 48. Piston rod 116 projects downwardly from the lower end of cylinder 112 and has a clevis 118 connected to the lower end thereof, said clevis straddling the lower dog member 50 for connection thereto by a clevis pin 120. From the foregoing, it will be seen that the cylinder 112 and the piston rod 116 respectively are connected to the upper and lower dog members 48 and 50 intermediately of the ends thereof. When suitable fluid, under pressure, is introduced to the upper end of the cylinder 112 by conduits, not shown, the forward ends of the dog members 48 and 50 will be separated to the greatest extent and assume the positions, for example, shown in exemplary manner in FIG. 3 wherein the upper dog member 48 occupies the phantom position and the lower dog member is substantially as shown either in its retracted or non-retracted position, both of which are illustrated in FIG. 3. Conversely, when fluid under pressure is introduced into the lower end of the cylinder 112 by additional means, not shown, the forward ends of the dog members 48 and 50 will be moved substantially into engaging position such as illustrated in the full line position of upper dog member 48 in FIG. 3 with respect to the lower dog member 50 shown therein. Description of the overall fluid-actuating system for the dog members as well as the movement of the headblock 32 relative to its supporting means and other movements of the device is set forth hereinafter in a description of the details of the schematic system illustrated in FIG. 15.

In the preferred operation of the dog members 48 and 50 in substantially vertical directions, especially for simplicity, it is preferred that the third fluid-operated cylinder unit 112 be operated to the fullest extent of such movement, whether the outer ends of the dog members are being moved toward each other or away from each other, the only restriction upon such movement being imposed by the abutment of transverse pin 108 against the upper surface of bottom member 30 of headblock 32 when the outer end portions of the lower dog member 50 is disposed in the open-ended slot 28 at the forward end of bottom member 30; and the limit of movement of the piston on the upper end of piston rod 116 within the cylinder 112; as well as the limitation of the movement of the outer ends of the upper and lower dog members 48 and 50 toward each other when the sharpened bits on the outer ends of said dog members engage a log, plank or otherwise. Fluid forces imposed upon the piston in the cylinder 112 under such latter circumstances serve to maintain the sharpened bits firmly imbedded in the log or plank and thus secure the same in operative position with the series of headblocks 32 mounted upon the sawmill carriage 10. Normally, such log or plank will abut the forward face of the headblock 32 and also be disposed upon the upper surface of the channel member 22. However, it is possible to support a log, as shown in exemplary manner in FIG. 5, when the log is positioned above the upper surface of the channel member 22, under which conditions the outer end of the lower dog member 50 is disposed in an elevated position with respect to channel member 22. Such a condition could arise, for example, where a log is curved upwardly at one portion but it is necessary to support the log and hold it firmly relative to one of the individual headblocks 32 as shown in exemplary manner in FIG. 4.

CONTROL SYSTEM FOR THE UNITS

Figure 15:
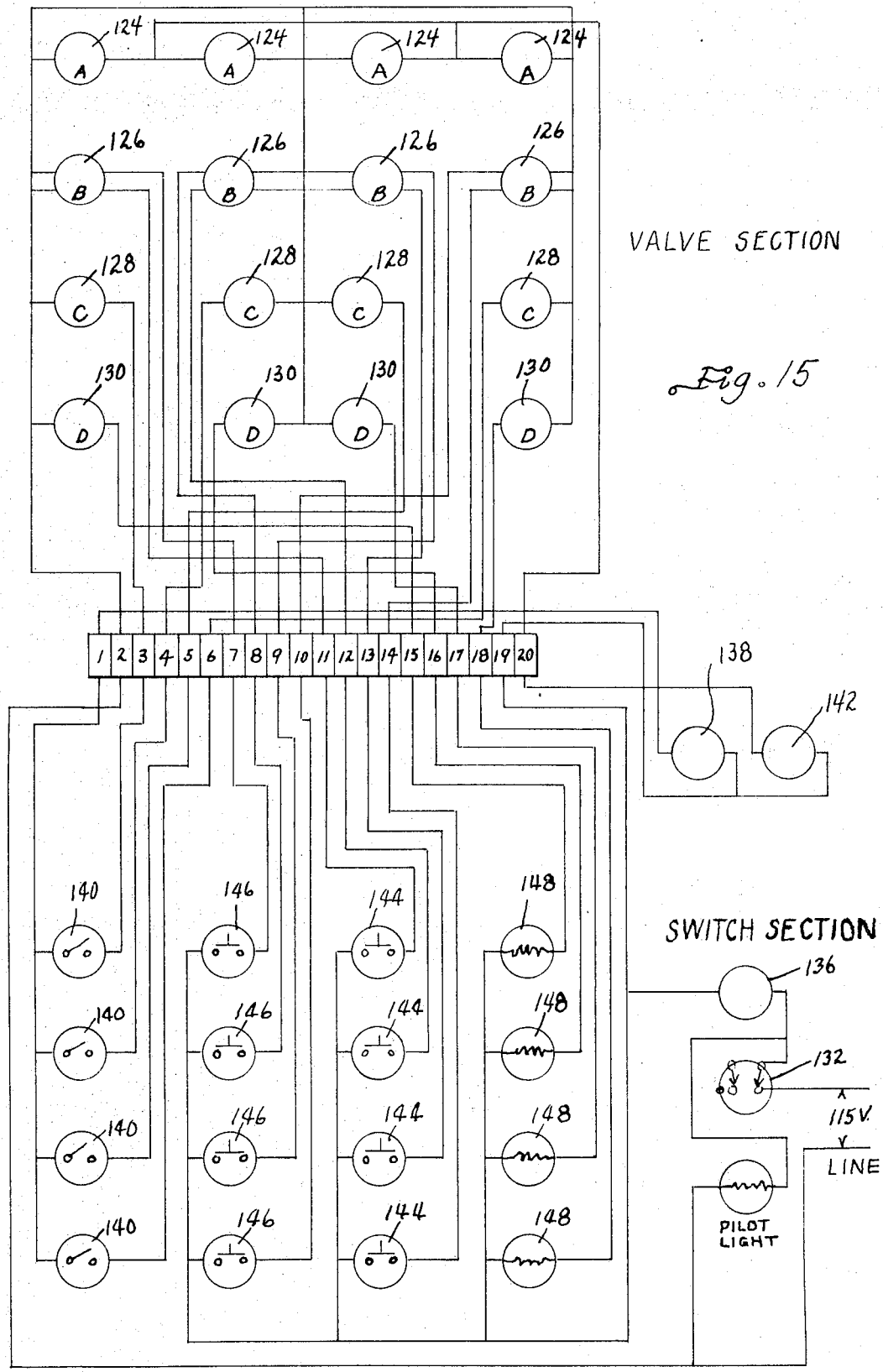
FIG. 15 is a diagramatic plan view of fluid control valves and electrical solenoid actuating means therefor comprising the control and operating means for the fluid-operated units of the sawmill dog assembly illustrated in the preceding figures.

It will be understood that the control circuitry illustrated in FIG. 15 is arranged to serve a series of four headblocks 32, the dog members 48 and 50 carried thereby, and the operating cylinder units 74, 94 and 110 for each headblock and the supporting and actuating means therefor. For purposes of simplicity, all of the various conduit lines and fluid supply lines will not be described in detail in view of the fact that, in particular, the wiring is of a standard nature. Referring also to FIGS. 3 and 4, a suitable supporting housing 122 is shown mounted above the cylinder unit 94 for purposes of supporting fluid control valves 124, 126 and 128. Valve 124 controls the flow of fluid to cylinder 74; valve 126 controls the flow of fluid to cylinder 94; and control valve 128 controls the flow of fluid to cylinder 112 of the third cylinder unit 110. The valves 124, 126 and 128 are of the double-acting type and are controlled by solenoid-actuated switches shown in the lower portion of the circuitry of FIG. 15, the same being connected by appropriate electrical conduits to the aforementioned valves. Appropriate conduits between the valves and opposite ends of the cylinders they control have been omitted for clarity and simplicity of the views. All of the valves also include solenoid activators. Without restriction, gaseous fluid of 70 to 100 psi operates the units quickly.

Referring to FIG. 15, in the upper portion, fluid control valves are shown in circuit with the control switches in the lower portion of the figure, the upper portion also showing switches 130 and fluid operating units for warning lights which are mounted on a suitable console board, not shown, adjacent the carriage 10, for purposes to be described. The same console also has the normal push buttons, not shown, threon for the switches which are in circuit with the solenoids to activate the valves 124, 126 and 128.

In the circuit, there is a master switch 132 in the 115 volt current feed line 134 which is in circuit with a fuse or circuit breaker 136 and, through binding block 19, is connected with double throw switch 138 which has UP and DOWN buttons which control the operation of the solenoids of valves 128 for the third cylinder units 110 which move the upper and lower dog members 48 and 50 relative to each other. Switch 138 can operate the dogs of all headblocks simultaneously but, through binding block 1, said switch is in circuit with additional auxiliary switches 140 which individually may be opened to immobilize the dogs on any selected headblock, if desired.

Switch 142 also is of the double throw type and has IN and OUT buttons and is connected in circuit, through binding block 20, with the solenoids of valves 124 to control the in and out movement of first cylinder units 74 by which the dog members are projected or retracted relative to the front face of the headblocks.

For purposes of activating the second cylinder units 94 by which the headblocks may be moved selectively and independently relative to base plate 26 of any selected sawmill dog assembly 14, the circuit includes control valves 126 and the solenoids therefor. Said solenoids are actuated respectively, in In and OUT directions, by separate switches 144 and 146 shown in the lower portion of FIG. 15. Such independent operation is for purposes, for example, of straightening a bent log which is to be sawed as supported by the plurality of dog assemblies 14 or carriage 10.

Under the foregoing circumstances, where one or more of the headblocks is moved upon its base plate 26, especially in an outward direction beyond the other headblocks, it can be seen that such further projecting headblock unit or at least the dogs thereof could be engaged by the saw blade when a particular log is advanced laterally upon the carriage 10 toward the saw blade. To call this situation to the attention of the mill operator, signal lights 148 which are in circuit with the switches 144 and 146 will be energized as will be seen by tracing the circuitry of FIG. 15. This is accomplished by switches 130 being closed by an actuator 150 carried by member 90, for example, see FIG. 4. When the headblock in any such non-uniform position is restored to normal position, the actuator 150 releases switch 130 and permits it to open and thereby extinguish light 148 for said unit.

In the foregoing, only the essential elements and circuit lines have been described relative to FIG. 15 because, essentially the wiring and sets of binding blocks 1–20 are conventional and further detailed description is not believed to be essential.

From the detailed description set forth above, it will be seen that improved sawmill dog assemblies have been provided which are relatively simple, rugged and durable, capable of being operated at a safe distance from the saw blade of a mill, by push-button activated switches to control all of the cylinder units, as well as provide suitable warning lights for abnormal positioning of any of the headblocks and dogs therein relative to the base plate of any particular sawmill dog assembly.

While the invention has been described and illustrated in its preferred embodiments, it should be understood that the invention is not to be limited to the precise details herein illustrated and described since the same may be carried out in other ways falling within the scope of the invention as illustrated and described.

1. A sawmill dog assembly comprising in combination, an elongated supporting channel member adapted to be connected to a carriage chassis for movement along track rails in a sawmill, an elongated flat horizontal base plate slidable longitudinally along the top of said channel member, a vertically extending headblock having a vertical forward portion provided with a vertically slotted front face and a horizontal rearward portion having a rearward extension thereon, upper and lower elongated dog members terminating at the forward ends in sharpened bits extending toward each other and projecting through the slot in said forward portion of said headblock, a connecting equalizing link pivotally connected at its opposite ends respectively to the rearward ends of said dog members, a first fluid-operated cylinder and piston unit, upstanding means on said headblock rearwardly of said vertical forward portion, means connecting the piston rod of said first fluid-operated unit thereto and the cylinder thereof extending rearwardly, and means connecting said cylinder to the mid-portion of said equalizing link, a substantially horizontal second fluid-operated cylinder fixed to the rearward end portion of said base plate and having a piston rod fixed at the outer end thereof directly to said rearward extension of said headblock and operable to move said headblock and dog members longitudinally relative to said base plate, rack fastened to said base plate, a pinion gear meshing with said rack and rotatable about a fixed axis extending transversely to said supporting channel member, a third fluid-operated cylinder and piston unit extending between the intermediate portions of said dog members and pivotally connected thereto and operable to move the bits thereon between fully separated position and a position in which they are substantially in contact with each other, and fluid conduit and control means connected to said cylinders and connectable to a source of fluid under pressure.

2. The sawmill dog assembly according to claim 1 in which said vertical forward portion and horizontal rearward portion of said headblock comprise a pair of parallel substantially L-shaped side plates extending upwardly from and connected to the opposite side edges of a bottom plate from which said rearward extension of said horizontal rearward portion of said headblock projects, said headblock also including a pair of narrow vertical guide strips fixed to and extending along the inner surfaces of said side plates and spaced apart transversely thereon a predetermined distance to control the limits of movement of said bits on said dog movements relative to the front face of said headblock, and pins extending through said dog members a limited distance from the forward ends thereof and the ends thereof being disposed between said guide strips.

3. The sawmill dog assembly according to claim 2 in which said bottom plate of said headblock has a series of elongated slots therein, and guide bolts extending through said slots and threadably connected to said base plate to serve as guide means for movement of said headblock relative to said base plate by said second fluid-operated cylinder.

4. The sawmill dog assembly according to claim 3 further including a shield strip overlying said bottom plate of said headblock sufficiently to cover said slots therein throughout the limit of movement thereof relative to said base plate and thereby shield said slots against the ingress of extraneous material, said guide bolts extending through holes in said shield strip.

5. The sawmill dog assembly according to claim 4 further including spacing collars mounted on said guide bolts and disposed in said slots in said bottom plate of said headblock, said spacing collars being slightly longer than the thickness of said bottom plate, whereby said headblock may slide upon said base plate without binding and said shield strip serves to prevent any appreciable canting of said headblock relative to said base plate during operation of said sawmill dog assembly.

6. The sawmill dog assembly according to claim 1 further including electric signal means adapted to indicate when said dog assembly is abnormally positioned relative to other dog assemblies in a series thereof, switch means on said assembly in circuit with said signal means, and said headblock has a switch actuating member thereon positioned to engage said switch to open the same when said headblock has been positioned in normal alignment with the other dog assemblies.

7. The sawmill dog assembly according to claim 1 in which the rearward end portion of said horizontal rearward portion of said headblock has a connecting member supported for limited movement about a horizontal pivot and a bore therethrough extending substantially in parallel relationship to the longitudinal axis of said base plate, the outer end of the piston rod of said first cylinder unit extending through said bore of said connecting member to permit a limited amount of floating movement of said first cylinder unit relative to said horizontal pivot during actuation of said dog members by said cylinder unit.

* * * * *